US009253119B2

(12) United States Patent
Li et al.

(10) Patent No.: US 9,253,119 B2
(45) Date of Patent: Feb. 2, 2016

(54) METHOD AND APPARATUS FOR ADMINISTRATIVE UNIT-3 CIRCUIT EMULATION

(71) Applicant: HUAWEI TECHNOLOGIES CO., LTD., Shenzhen (CN)

(72) Inventors: Chunrong Li, Shenzhen (CN); Dajun Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 143 days.

(21) Appl. No.: 14/098,221

(22) Filed: Dec. 5, 2013

(65) Prior Publication Data
US 2014/0092920 A1 Apr. 3, 2014

Related U.S. Application Data

(63) Continuation of application No. PCT/CN2011/076270, filed on Jun. 24, 2011.

(51) Int. Cl.
*H04L 12/931* (2013.01)
*H04J 3/16* (2006.01)
*H04L 12/64* (2006.01)

(52) U.S. Cl.
CPC .............. *H04L 49/20* (2013.01); *H04J 3/1611* (2013.01); *H04L 12/6418* (2013.01); *H04J 2203/0089* (2013.01)

(58) Field of Classification Search
None
See application file for complete search history.

(56) References Cited

U.S. PATENT DOCUMENTS 6,603,776 B1 * 8/2003 Fedders et al. ................ 370/476
6,633,584 B1 * 10/2003 Russell et al. ................ 370/466
6,891,862 B1 * 5/2005 Brady et al. .................. 370/539

(Continued)

FOREIGN PATENT DOCUMENTS

CN     1674478 A    9/2005
CN     1728713 A    2/2006

(Continued)

OTHER PUBLICATIONS

International Telecommunication Union, "Network node interface for the Synchronous Digital Hierarchy (SDH)" Series G: Transmission Systems and Media, Digital Systems and Networks, G.707, Oct. 2000, 178 pages.

(Continued)

*Primary Examiner* — Anez Ebrahim
*Assistant Examiner* — Gautam Sharma
(74) *Attorney, Agent, or Firm* — Brinks Gilson & Lione

(57) ABSTRACT

The present invention discloses a method for AU-3 circuit emulation, including: converting frame data from an administrative unit AU-3 frame format into a tributary unit TU-3 frame format; mapping the frame data in the TU-3 frame format into a virtual container VC4 to obtain the frame data in a VC4 frame format; and emulating the frame data in the VC4 frame format. In embodiments of the present invention, frame data is converted from an AU-3 frame format into a TU-3 frame format, and the frame data in the TU-3 frame format is mapped into a virtual container VC4 to obtain frame data in the VC4 frame format. In this way, the frame data in the VC4 frame format is emulated, a requirement of transparently transmitting AU pointers in the present network is fulfilled, that is, the requirement of emulating and transparently transmitting the content of an entire AU is fulfilled.

4 Claims, 13 Drawing Sheets

(56) References Cited

U.S. PATENT DOCUMENTS

| | | |
|---|---|---|
| 2001/0033575 A1 | 10/2001 | Shimamura et al. |
| 2002/0015411 A1 | 2/2002 | Kataoka et al. |
| 2002/0037019 A1* | 3/2002 | Heuer .......................... 370/539 |
| 2002/0191648 A1* | 12/2002 | Yehuda et al. ................ 370/539 |
| 2004/0213282 A1* | 10/2004 | Kirk et al. ..................... 370/458 |
| 2005/0111370 A1* | 5/2005 | Cohen .......................... 370/242 |
| 2010/0124992 A1* | 5/2010 | Park et al. ...................... 463/42 |
| 2013/0039659 A1 | 2/2013 | Li |

FOREIGN PATENT DOCUMENTS

| | | |
|---|---|---|
| CN | 101848147 A | 9/2010 |
| CN | 102098131 A | 6/2011 |
| EP | 1217788 A1 | 6/2002 |
| JP | 2001-308863 A | 11/2001 |
| JP | 2001-339409 A | 12/2001 |
| JP | 2011040992 A | 2/2011 |
| WO | WO 01/20852 A1 | 3/2001 |

OTHER PUBLICATIONS

Author Unknown "Synchronous Optical Network (SONET) Transport Systems: Common Generic Criteria" Bellcore, GR-253-CORE, Issue 2, Dec. 1995 with revision 2, Jan. 1999, 788 pages.

Schulzrinne et al., "RTP: A Transport Protocol for Real-Time Applications" Network Working Group, Jul. 2003, 111 pages.

M. Riegel, "Requirements for Edge-to-Edge Emulation of Time Division Multiplexed (TDM) Circuits over Packet Switching Networks" Network Working Group, Oct. 2005, 25 pages.

Malis et al., "Synchronous Optical Network/Synchronous Digital Hierarchy (SONET/SDH) Circuit Emulation over Packet (CEP)" Network Working Group, Apr. 2007, 44 pages.

* cited by examiner

METHOD AND APPARATUS FOR ADMINISTRATIVE UNIT-3 CIRCUIT EMULATION

CROSS-REFERENCE TO RELATED APPLICATIONS

This application is a continuation of International Application No. PCT/CN2011/076270, filed on Jun. 24, 2011, which is hereby incorporated by reference in its entirety.

TECHNICAL FIELD

Embodiments of the present invention relate to the field of circuit emulation technologies, and in particular, to a method and an apparatus for administrative unit-3 (Administrative Unit-3, AU-3) circuit emulation.

BACKGROUND

SDH (Synchronous Digital Hierarchy, synchronous digital hierarchy) is an integrated information transport network operated by a uniform network management system, integrating functions such as multiplexing, line transmission and switching. Due to too high maintenance costs, an SDH network is no longer expanded in the prior art, and a new PTN (Packet Transport Network, packet transport network) is built in place of the existing SDH network. However, numerous TDM (Time Division Multiplex, time division multiplex) circuits and services existing in the SDH network still need to be borne by the PTN network. Therefore, in a case that a PTN network replaces an SDH network, a technology of pseudo wire is used on the SDH network side to emulate an SDH/Sonet (Synchronous Optical Network, synchronous optical network) service, and transmit the emulated data to a peer SDH network transparently through the PTN network, thereby implementing service bearing in the case that a PTN network replaces an SDH network.

In the existing emulation technology, only SDH transmitter-side virtual containers or Sonet payloads are emulated and transmitted transparently, but it is not practicable to emulate and transparently transmit an AU (Administrative Unit, administrative unit) pointer. Instead, a position of a J1 byte in frame data is recorded and placed in a CEP (Circuit Emulation over Packet, circuit emulation over packet) packet header, and a pointer is re-generated at downlink on the SDH peer side according to the position of the J1 byte. In practical application, some telecom operators need to transparently transmit the AU pointer, that is, emulate and transparently transmit the content of the entire AU. The prior art provides no solution to emulating and transparently transmitting the AU pointer.

SUMMARY

To emulate and transparently transmit all content of an AU, embodiments of the present invention provide an AU-3 circuit emulation method. The method includes:

converting frame data from an administrative unit AU-3 frame format into a tributary unit TU-3 frame format;
mapping the frame data in the TU-3 frame format into a virtual container VC4 to obtain the frame data in a VC4 frame format; and
emulating the frame data in the VC4 frame format.

An embodiment of the present invention further provides an AU-3 circuit recovery method, including:

recovering frame data in a virtual container VC4 format from a received packet;
demapping the frame data in the VC4 format into the frame data in a tributary unit TU-3 frame format; and
converting the frame data in the TU-3 frame format into the frame data in an administrative unit AU-3 frame format.

An embodiment of the present invention further provides an AU-3 circuit emulation apparatus, including:

a TU-3 frame format converting module, configured to convert frame data from an administrative unit AU-3 frame format into a tributary unit TU-3 frame format;
a VC4 frame format data mapping module, configured to map the frame data in the TU-3 frame format into a virtual container VC4 to obtain the frame data in a VC4 frame format; and
a VC4 frame format data emulating module, configured to emulate the frame data in the VC4 frame format.

An embodiment of the present invention further provides an AU-3 circuit recovery apparatus, including:

a frame data recovering module, configured to recover frame data in a virtual container VC4 format from a received packet;
a VC4 frame format data demapping module, configured to demap the frame data in the VC4 format into the frame data in a TU-3 frame format; and
a TU-3 frame format data converting module, configured to convert the frame data in the tributary unit TU-3 frame format into the frame data in an administrative unit AU-3 frame format.

In embodiments of the present invention, frame data is converted from an AU-3 frame format into a TU-3 frame format, the frame data in the TU-3 frame format is mapped into a virtual container VC4 to obtain the frame data in the VC4 frame format, and the frame data in the VC4 frame format is emulated, thereby meeting a requirement of transparently transmitting AU pointers in the present network, that is, the requirement of emulating and transparently transmitting the content of an entire AU.

BRIEF DESCRIPTION OF DRAWINGS

To illustrate the technical solutions in embodiments of the present invention or in the prior art more clearly, the following briefly describes the accompanying drawings required for describing the embodiments or the prior art. Apparently, the accompanying drawings in the following description merely show some embodiments of the present invention, and persons of ordinary skill in the art can derive other drawings from these accompanying drawings without creative efforts.

DESCRIPTION OF EMBODIMENTS

To make the objectives, technical solutions, and advantages of embodiments of the present invention more comprehensible, the following describes the technical solutions in embodiments of the present invention clearly and comprehensively with reference to the accompanying drawings of the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
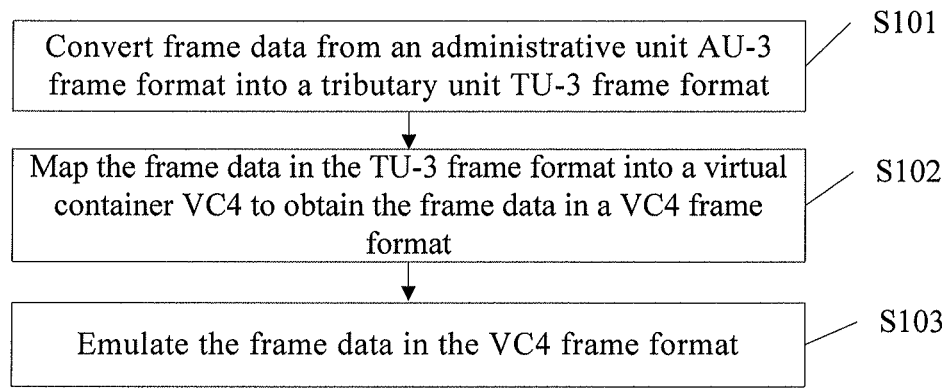
FIG. 1 is a flowchart of a method for AU-3 circuit emulation according to Embodiment 1 of the present invention.

FIG. 1 is a flowchart of a method for AU-3 circuit emulation provided in the present invention. The method is applied to a PTN network, and includes the following steps:

S101. Convert frame data from an administrative unit AU-3 frame format into a tributary unit TU-3 frame format.

S102. Map the frame data in the TU-3 frame format into a virtual container VC4 to obtain the frame data in a VC4 frame format.

S103. Emulate the frame data in the VC4 frame format.

Preferably, the frame data in the VC4 frame format may be emulated according to an SDH circuit and service emulation technology defined in Internet engineering task force (Internet Engineering Task Force) IETF Request For Comments RFC 4842 protocol.

Figure 2:
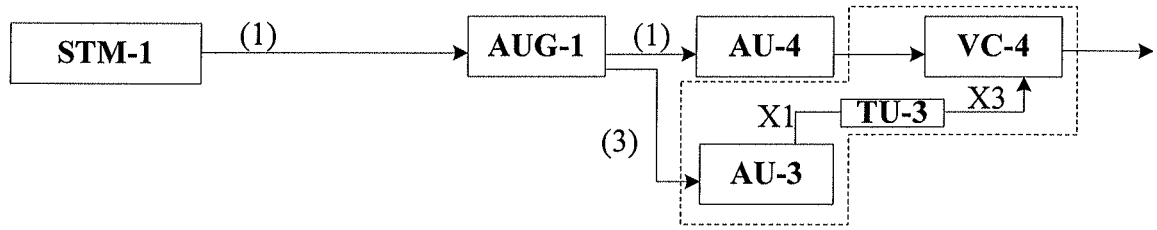
FIG. 2 is a schematic diagram of an AU-3 circuit emulation mapping path according to Embodiment 1 of the present invention.

In this embodiment, S101 to S102 may be implemented through a mapping path shown in FIG. 2, where an STM-1 (synchronous transport module-1, Synchronous Transport Module-1) includes three AU-3s, each AU-3 is converted into one TU-3, and three TU-3s are encapsulated into one VC4.

The service mapping path of converting the AU-3 to the TU-3 is shown by the dashed box in FIG. 2.

It should be noted that in this embodiment, after the frame data in the VC4 frame format is emulated, the emulated data is encapsulated into a CEP packet, whereupon the CEP packet is transmitted in a PTN network. After receiving the CEP packet, the peer network recovers the frame data in the AU-3 frame format from the CEP packet. For the detailed recovery method, see embodiments of the method for AU-3 circuit recovery provided in the present invention.

In the embodiment of the present invention, frame data is converted from an AU-3 frame format into a TU-3 frame format, the frame data in the TU-3 frame format is mapped into a virtual container VC4 to obtain the frame data in the VC4 frame format, and the frame data in the VC4 frame format is emulated, thereby meeting a requirement of transparently transmitting AU pointers in the present network, that is, the requirement of emulating and transparently transmitting the content of an entire AU.

Embodiment 2

Figure 3:
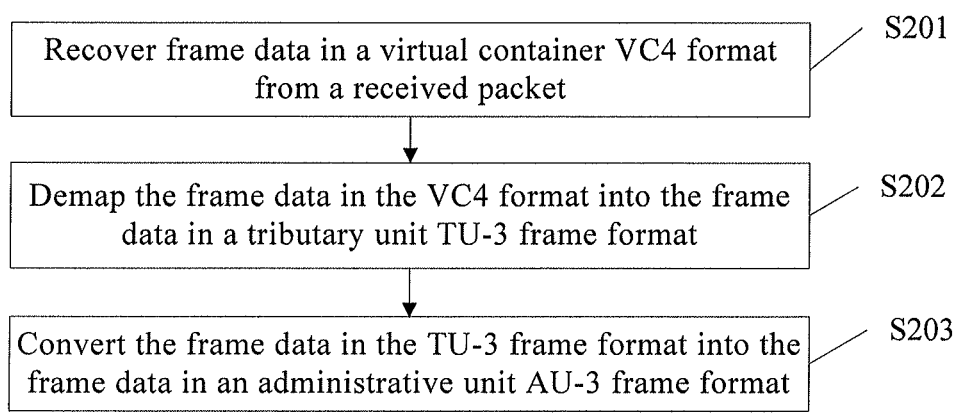
FIG. 3 is a flowchart of a method for AU-3 circuit recovery according to Embodiment 2 of the present invention.

FIG. 3 shows a method for AU-3 circuit recovery provided in the present invention. The method is applicable to recovery of emulated data that is generated by using the method for AU-3 circuit emulation provided in Embodiment 1 of the present invention. The method includes:

S201. Recover frame data in a virtual container VC4 format from a received packet.

Preferably, the frame data in a virtual container VC4 format is recovered from the received packet according to an SDH circuit and service recovery technology defined in RFC4842 protocol.

S202: Demap the frame data in the VC4 format into the frame data in a tributary unit TU-3 frame format.

S203. Convert the frame data in the TU-3 frame format into the frame data in an administrative unit AU-3 frame format.

In the embodiment of the present invention, the frame data in the received packet is converted from a TU-3 frame format into an AU-3 frame format, thereby recovering the emulated data that is generated by using the method for AU-3 circuit emulation described in the preceding embodiment and meeting the requirement of transparently transmitting AU pointers in the present network, that is, the requirement of emulating and transparently transmitting the content of an entire AU.

Embodiment 3

Figure 4:
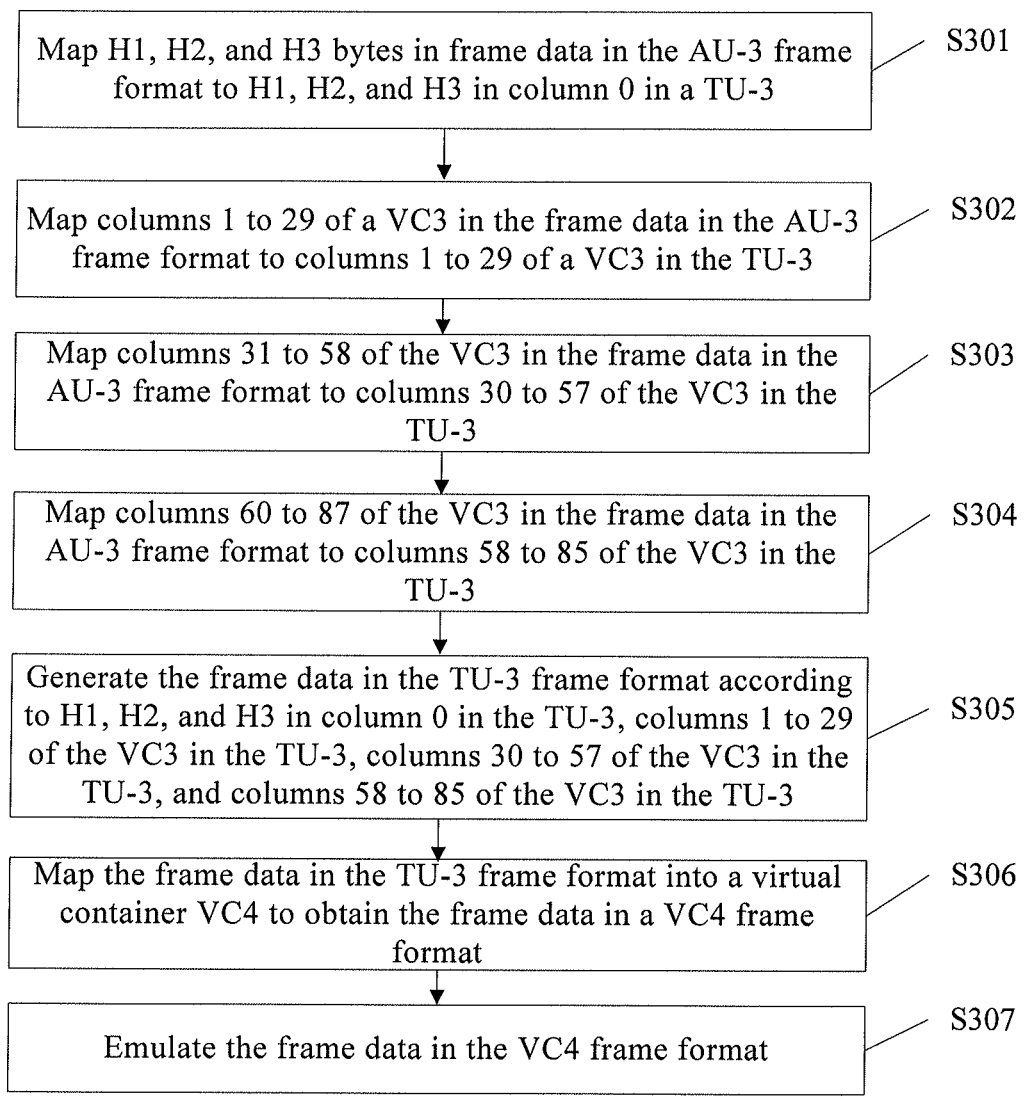
FIG. 4 is a flowchart of a method for AU-3 circuit emulation according to Embodiment 3 of the present invention.

FIG. 4 is a flowchart of a method for AU-3 circuit emulation according to another embodiment of the present invention. The method includes the following steps:

S301. Map H1, H2, and H3 bytes in frame data in an AU-3 frame format to H1, H2, and H3 in column 0 in a TU-3.

S302. Map columns 1 to 29 of a VC3 in the frame data in the AU-3 frame format to columns 1 to 29 of a VC3 in the TU-3.

S303. Map columns 31 to 58 of the VC3 in the frame data in the AU-3 frame format to columns 30 to 57 of the VC3 in the TU-3.

S304. Map columns 60 to 87 of the VC3 in the frame data in the AU-3 frame format to columns 58 to 85 of the VC3 in the TU-3.

S305. Generate the frame data in a TU-3 frame format according to H1, H2, and H3 in column 0 in the TU-3, columns 1 to 29 of the VC3 in the TU-3, columns 30 to 57 of the VC3 in the TU-3, and columns 58 to 85 of the VC3 in the TU-3.

S306. Map the frame data in the TU-3 frame format into a virtual container VC4 to obtain the frame data in a VC4 frame format.

S307. Emulate the frame data in the VC4 frame format.

Figure 5:
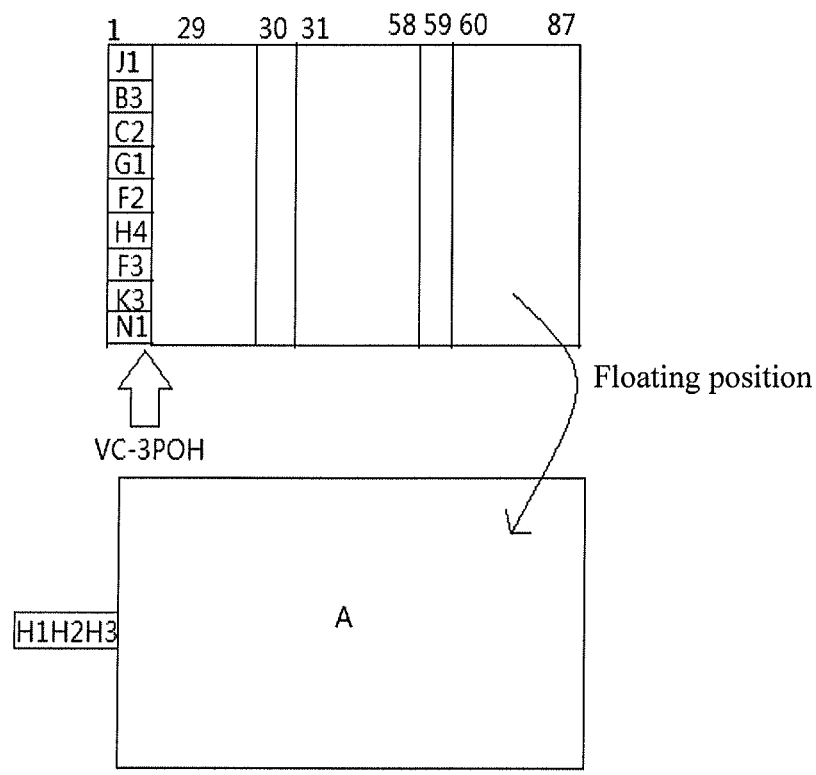
FIG. 5 is a schematic diagram of an AU-3 frame format according to Embodiment 3 of the present invention.
Figure 6:
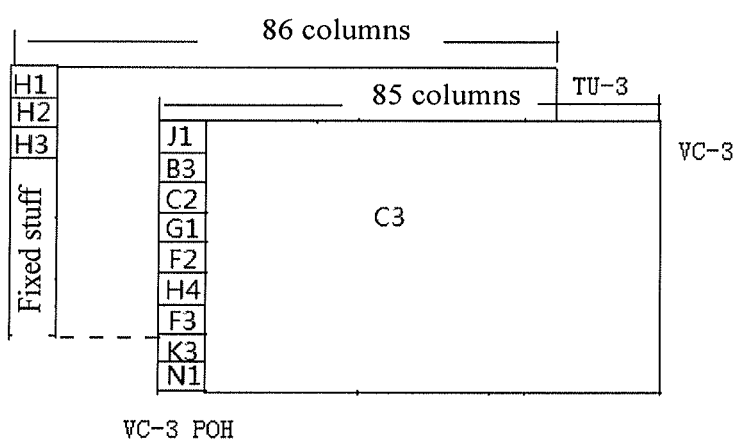
FIG. 6 is a schematic diagram of a TU-3 frame format according to Embodiment 3 of the present invention.
Figure 7:
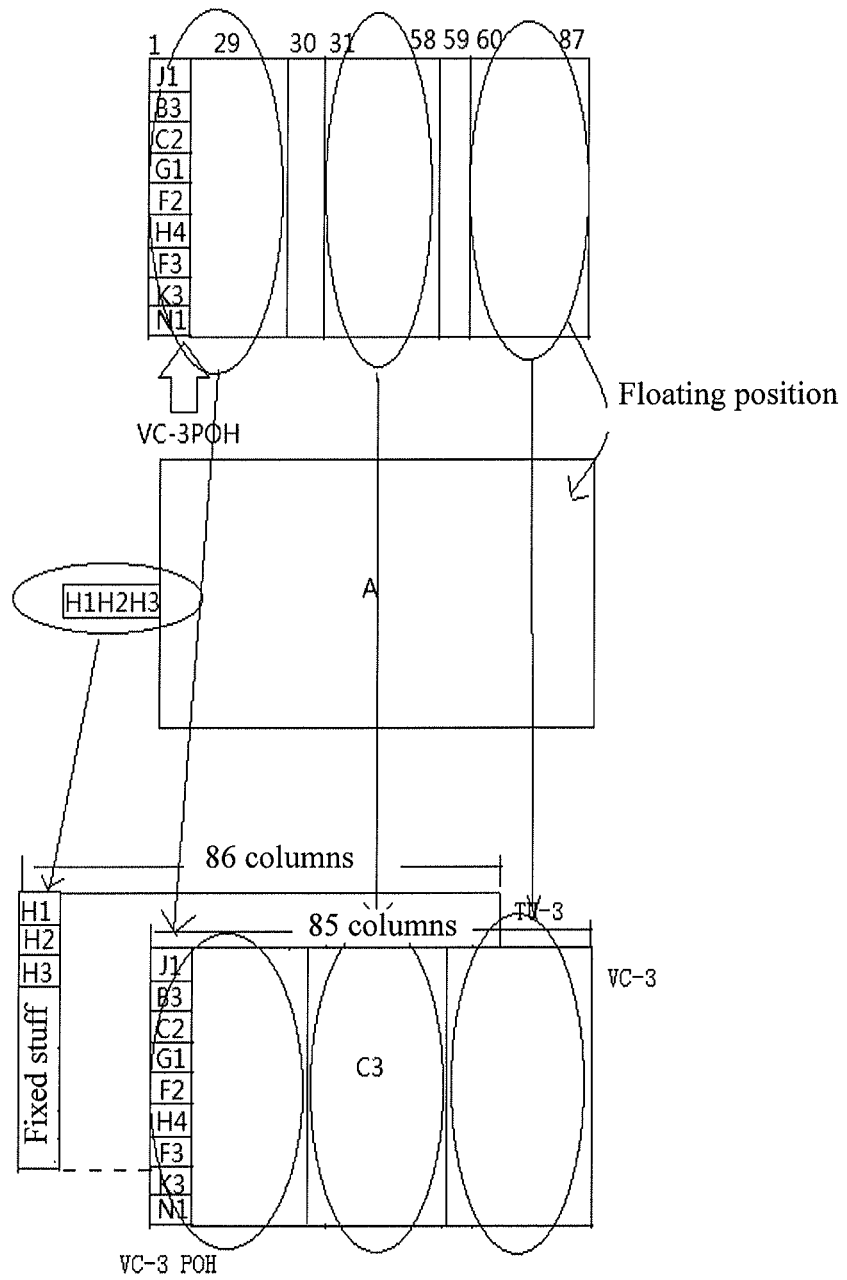
FIG. 7 is a schematic diagram of a loading mode according to Embodiment 3 of the present invention.

S301 to S305 in this embodiment are illustrated: FIG. 5 is a schematic diagram of an AU-3 frame format, FIG. 6 is a schematic diagram of a TU-3 frame format, and FIG. 7 is a schematic diagram of a loading mode in S301 to S305 of the embodiment, where an AU-3 frame is split and loaded into a TU-3 frame. As shown in FIG. 7, the detailed operations of the loading mode may be described briefly as follows:

Map H1, H2, and H3 bytes in an AU-3 to a column comprising H1, H2 and H3 in a TU-3;

Map columns 1 to 29 of the VC3 in the AU-3 to columns 1 to 29 of the VC3 in the TU-3;

Map columns 31 to 58 of the VC3 in the AU-3 to columns 30 to 57 of the VC3 in the TU-3; and Map columns 60 to 87 of the VC3 in the AU-3 to columns 58 to 85 of the VC3 in the TU-3.

The characteristics of the above operation mode are: no pointer value is changed, only the bytes other than fixed stuff of the VC3 in the AU-3 are loaded into the TU-3, and the content in the TU-3 and the deleted fixed stuff are re-placed into the AU-3 at the downlink on the peer side in an inverse way of the foregoing mode, where the fixed stuff are columns 30 and 59 of the VC3. This loading mode is applicable to, but without being limited to, the following scenario: the system clocks on both sides share the same source and pointer adjustment will not occur.

In the embodiment of the present invention, frame data is converted from an AU-3 frame format into a TU-3 frame format, the data in the TU-3 frame format is mapped into a virtual container VC4 to obtain data in the VC4 frame format, and the data in the VC4 frame format is emulated according to an SDH circuit and service emulation technology defined in RFC4842 protocol, thereby meeting a requirement of transparently transmitting AU pointers in the present network, that is, the requirement of emulating and transparently transmitting the content of an entire AU.

Embodiment 4

Figure 8:
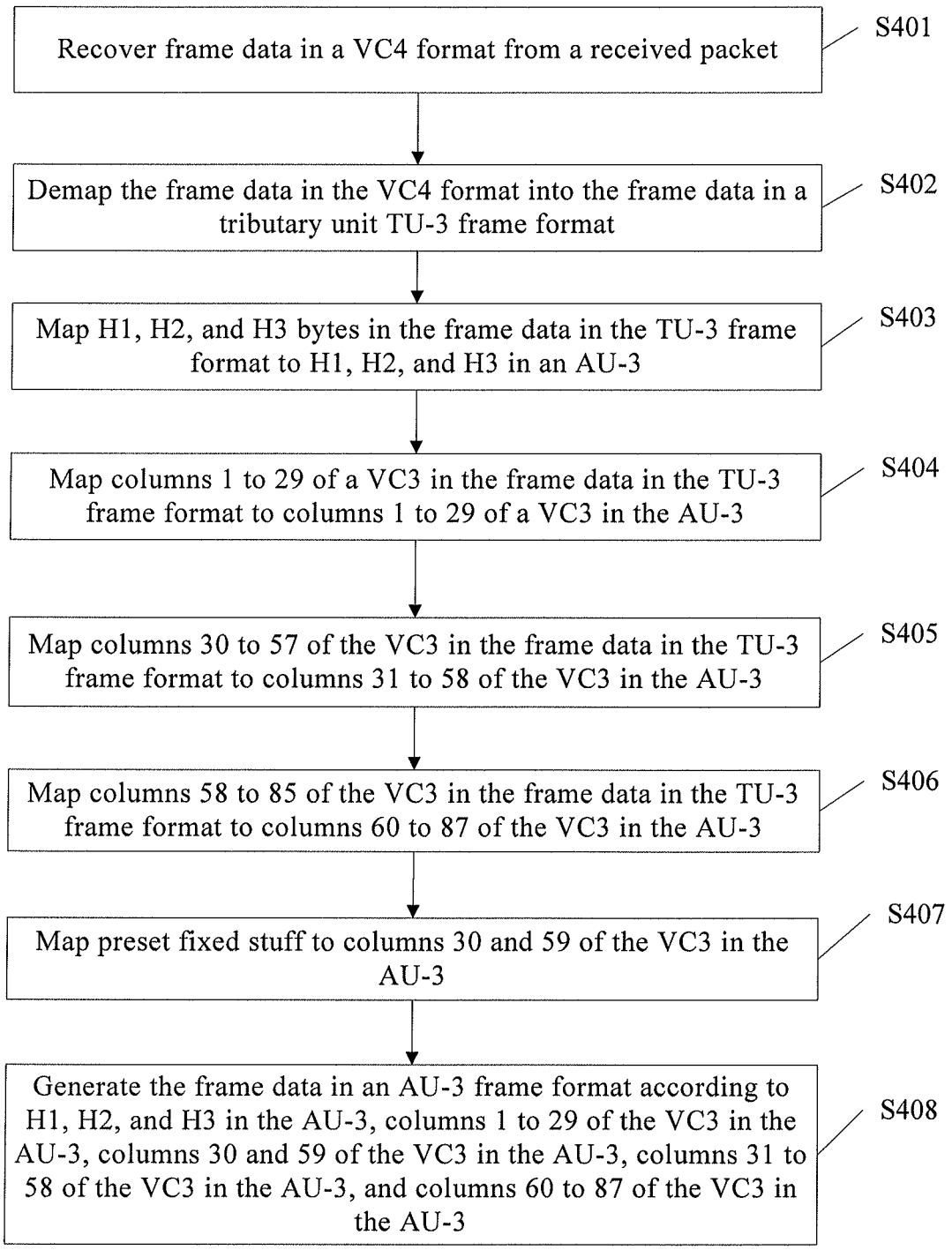
FIG. 8 is a flowchart of a method for AU-3 circuit recovery according to Embodiment 4 of the present invention.

FIG. 8 is a flowchart of a method for AU-3 circuit recovery according to another embodiment of the present invention. The method is applicable to recovery of emulated data that is generated by using the method for AU-3 circuit emulation provided in Embodiment 3 of the present invention. The method includes the following steps:

S401. Recover frame data in a VC4 format from a received packet.

S402. Demap the frame data in the VC4 format into the frame data in a tributary unit TU-3 frame format.

S403. Map H1, H2, and H3 bytes in the frame data in the TU-3 frame format to H1, H2, and H3 in an AU-3.

S404. Map columns 1 to 29 of a VC3 in the frame data in the TU-3 frame format to columns 1 to 29 of a VC3 in the AU-3.

S405. Map columns 30 to 57 of the VC3 in the frame data in the TU-3 frame format to columns 31 to 58 of the VC3 in the AU-3.

S406. Map columns 58 to 85 of the VC3 in the frame data in the TU-3 frame format to columns 60 to 87 of the VC3 in the AU-3.

S407. Map preset fixed stuff to columns 30 and 59 of the VC3 in the AU-3.

S408. Generate the frame data in an AU-3 frame format according to H1, H2, and H3 in the AU-3, columns 1 to 29 of the VC3 in the AU-3, columns 30 and 59 of the VC3 in the AU-3, columns 31 to 58 of the VC3 in the AU-3, and columns 60 to 87 of the VC3 in the AU-3.

In the embodiment of the present invention, the frame data in a VC4 format is recovered from a received packet, the frame data in the VC4 format is demapped into frame data in a TU-3 frame format, and then the frame data in the TU-3 frame format is converted into the frame data in an AU-3 frame format, thereby recovering the emulated data that is generated by using a method for AU-3 circuit emulation described in the preceding embodiment and meeting the requirement of transparently transmitting AU pointers in the present network, that is, the requirement of emulating and transparently transmitting the content of an entire AU.

Embodiment 5

Figure 9:
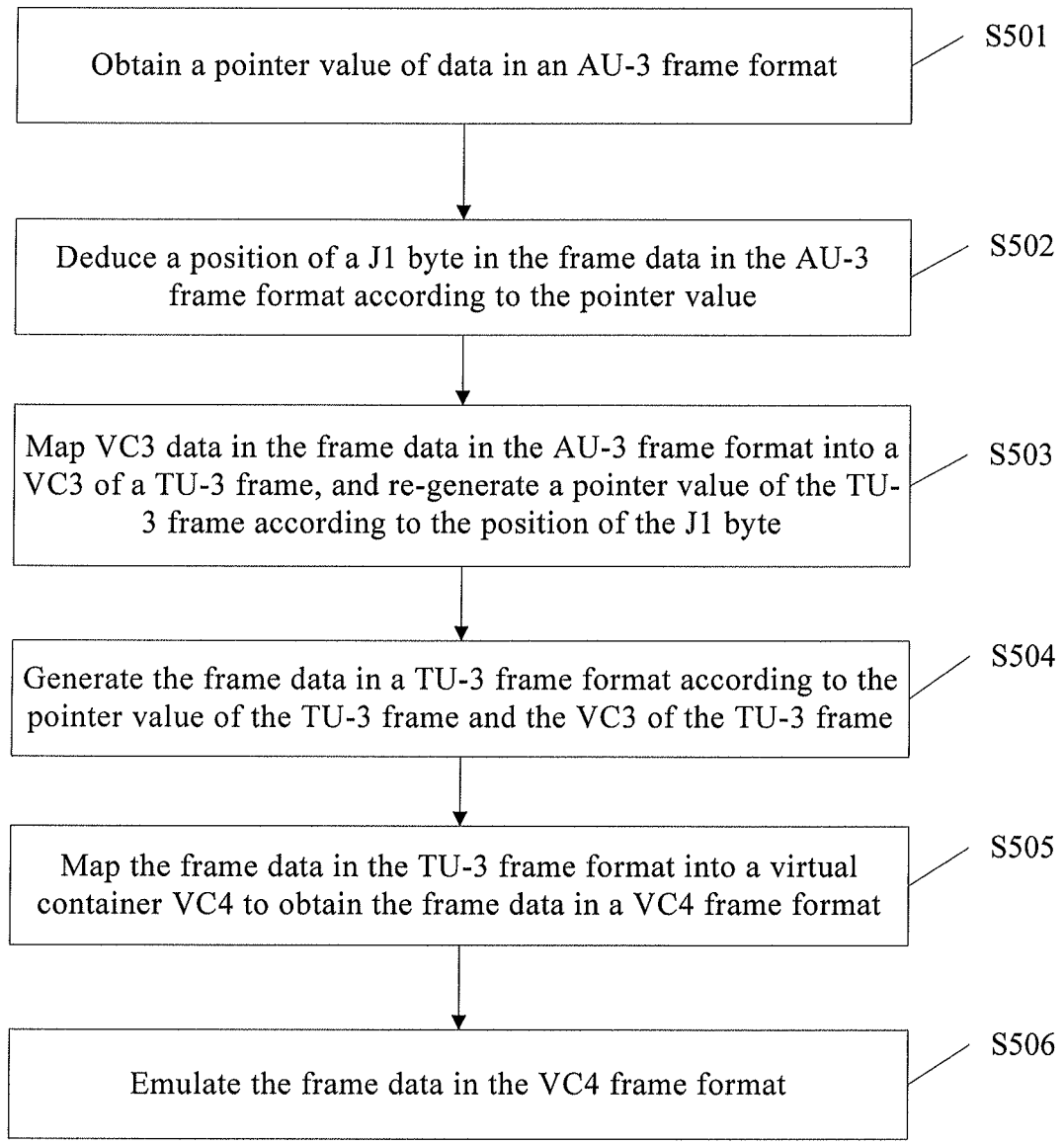
FIG. 9 is a flowchart of a method for AU-3 circuit emulation according to Embodiment 5 of the present invention.

FIG. 9 is a flowchart of a method for AU-3 circuit emulation according to another embodiment of the present invention. The method includes the following steps:

S501. Obtain a pointer value of frame data in an AU-3 frame format.

S502. Deduce a position of a J1 byte in the frame data in the AU-3 frame format according to the pointer value.

S503. Map VC3 data in the frame data in the AU-3 frame format into a VC3 of a TU-3 frame, and re-generate a pointer value of the TU-3 frame according to the position of the J1 byte.

S504. Generate the frame data in a TU-3 frame format according to the pointer value of the TU-3 frame and the VC3 of the TU-3 frame.

S505. Map the frame data in the TU-3 frame format into a virtual container VC4 to obtain the frame data in a VC4 frame format.

S506. Emulate the frame data in the VC4 frame format.

In the embodiment of the present invention, frame data is converted from an AU-3 frame format into a TU-3 frame format, the frame data in the TU-3 frame format is mapped into a virtual container VC4 to obtain frame data in the VC4 frame format, and the frame data in the VC4 frame format is emulated according to an SDH circuit and service emulation technology defined in RFC4842 protocol, thereby meeting a requirement of transparently transmitting AU pointers in the present network, that is, the requirement of emulating and transparently transmitting the content of an entire AU.

Embodiment 6

Figure 10:
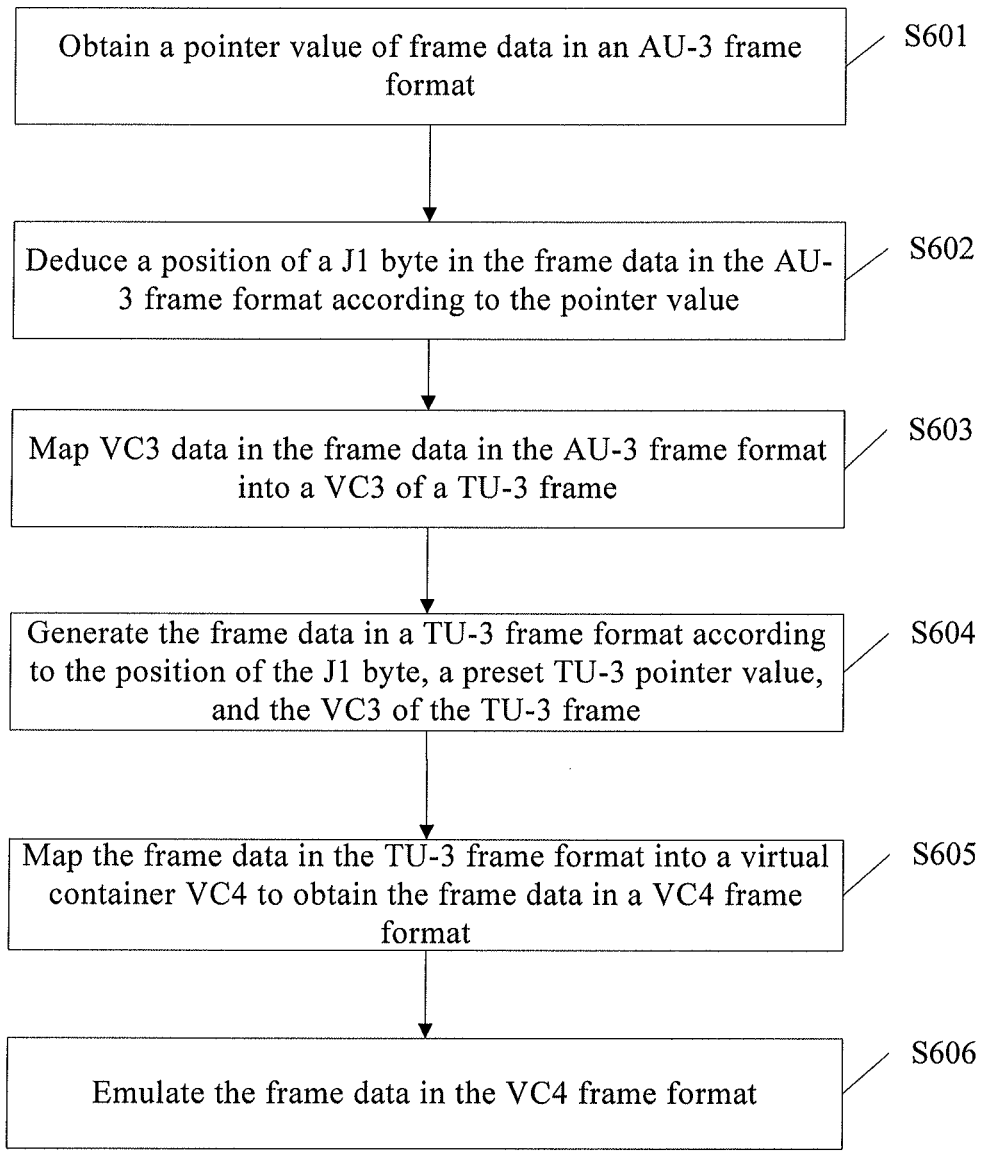
FIG. 10 is a flowchart of a method for AU-3 circuit emulation according to Embodiment 6 of the present invention.

FIG. 10 is a flowchart of a method for AU-3 circuit emulation according to another embodiment of the present invention. The method includes the following steps:

S601. Obtain a pointer value of frame data in an AU-3 frame format.

S602. Deduce a position of a J1 byte in the frame data in the AU-3 frame format according to the pointer value.

S603. Map VC3 data in the frame data in the AU-3 frame format into a VC3 of a TU-3 frame.

S604. Generate the frame data in a TU-3 frame format according to the position of the J1 byte, a preset TU-3 pointer value, and the VC3 of the TU-3 frame.

S605. Map the frame data in the TU-3 frame format into a virtual container VC4 to obtain the frame data in a VC4 frame format.

S606. Emulate the frame data in the VC4 frame format.

In the embodiment of the present invention, frame data is converted from an AU-3 frame format into a TU-3 frame format, the frame data in the TU-3 frame format is mapped into a virtual container VC4 to obtain frame data in the VC4 frame format, and the frame data in the VC4 frame format is emulated according to an SDH circuit and service emulation technology defined in RFC4842 protocol, thereby meeting a requirement of transparently transmitting AU pointers in the present network, that is, the requirement of emulating and transparently transmitting the content of an entire AU.

Embodiment 7

Figure 11:
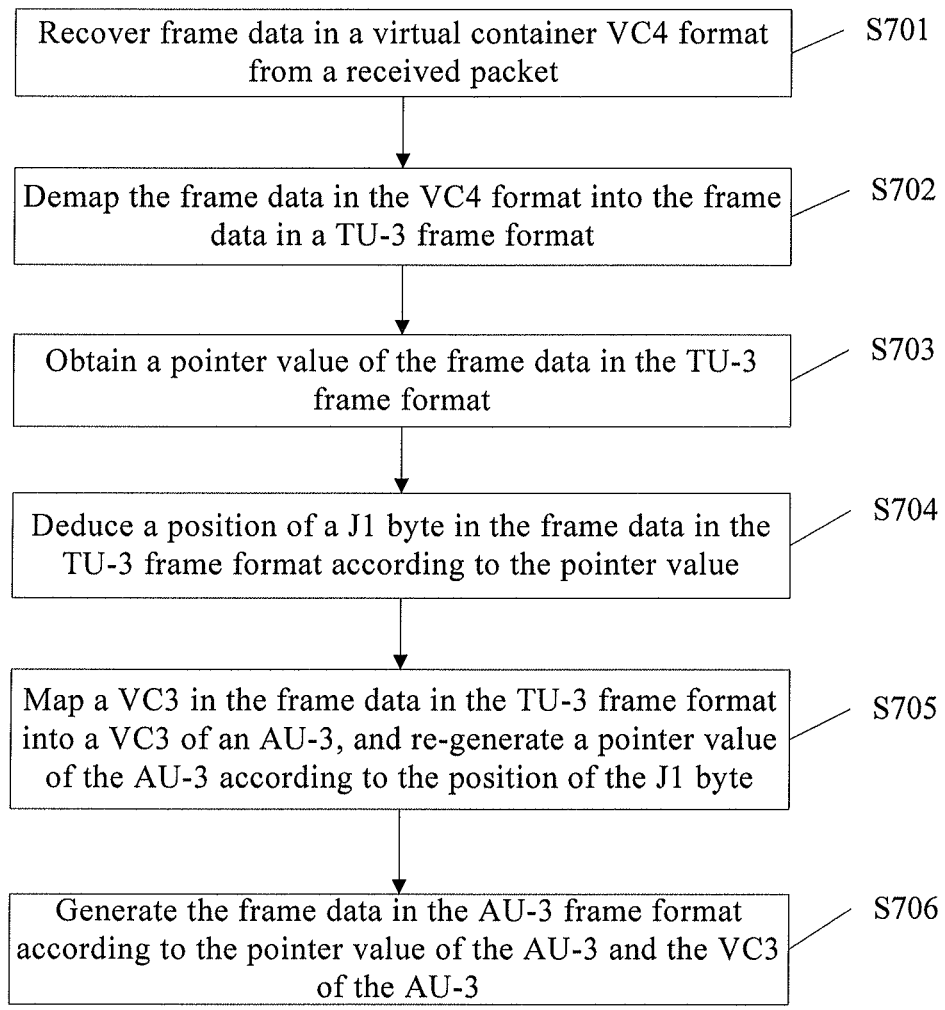
FIG. 11 is a flowchart of a method for AU-3 circuit recovery according to Embodiment 7 of the present invention.

FIG. 11 is a flowchart of a method for AU-3 circuit recovery according to another embodiment of the present invention. The method is applicable to recovery of emulated data that is generated by using the method for AU-3 circuit emulation provided in Embodiment 5 or 6 of the present invention. The method includes the following steps:

S701. Recover frame data in a virtual container VC4 format from a received packet.

S702: Demap the frame data in the VC4 format into the frame data in a TU-3 frame format.

S703. Obtain a pointer value of the frame data in the TU-3 frame format.

S704. Deduce the position of a J1 byte in the frame data in the TU-3 frame format according to the pointer value.

S705. Map a VC3 in the frame data in the TU-3 frame format into a VC3 of an AU-3, and re-generate a pointer value of the AU-3 according to the position of the J1 byte.

S706. Generate the frame data in the AU-3 frame format according to the pointer value of the AU-3 and the VC3 of the AU-3.

In the embodiment of the present invention, frame data in a VC4 format is demapped into the frame data in a TU-3 frame format, and the frame data in the TU-3 frame format is converted into the frame data in an AU-3 frame format, thereby recovering the emulated data that is generated by using a method for AU-3 circuit emulation described in the preceding embodiment and meeting the requirement of transparently transmitting AU pointers in the present network, that is, the requirement of emulating and transparently transmitting the content of an entire AU.

Embodiment 8

Figure 12:
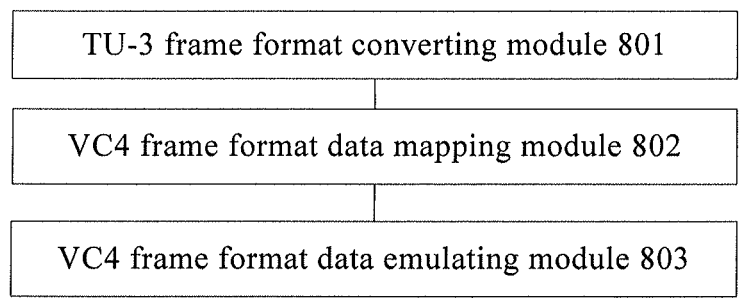
FIG. 12 is a schematic diagram of an apparatus for AU-3 circuit emulation according to Embodiment 8 of the present invention.

FIG. 12 shows an apparatus for AU-3 circuit emulation provided in the present invention. The apparatus is based on the same conception as the method for AU-3 circuit emulation provided in Embodiment 1, and the apparatus includes:
  a TU-3 frame format converting module 801, configured to convert frame data from an AU-3 frame format into a TU-3 frame format;
  a VC4 frame format data mapping module 802, configured to map the frame data in the TU-3 frame format into a virtual container VC4 to obtain the frame data in a VC4 frame format; and
  a VC4 frame format data emulating module 803, configured to emulate the frame data in the VC4 frame format.

In the embodiment of the present invention, frame data is converted from an AU-3 frame format into a TU-3 frame format, the frame data in the TU-3 frame format is mapped into a virtual container VC4 to obtain frame data in the VC4 frame format, and the frame data in the VC4 frame format is emulated according to an SDH circuit and service emulation technology defined in RFC4842 protocol, thereby meeting a requirement of transparently transmitting AU pointers in the present network, that is, the requirement of emulating and transparently transmitting the content of an entire AU.

Embodiment 9

Figure 13:
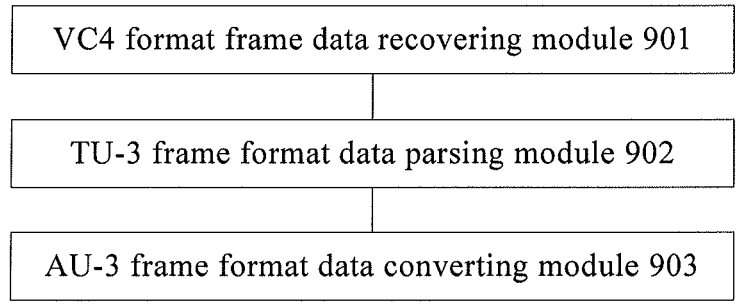
FIG. 13 is a schematic diagram of an apparatus for AU-3 circuit recovery according to Embodiment 9 of the present invention.

FIG. 13 shows an apparatus for AU-3 circuit recovery provided in the present invention. The apparatus is based on the same conception as the method for AU-3 circuit recovery provided in Embodiment 2, and is applicable to recovery of emulated data generated by the apparatus for AU-3 circuit emulation provided in Embodiment 8 of the present invention. The apparatus includes:
  a VC4 format frame data recovering module 901, configured to recover frame data in a virtual container VC4 format from a received packet;
  a TU-3 frame format data parsing module 902, configured to demap the frame data in the VC4 format into frame data in a TU-3 frame format; and
  an AU-3 frame format data converting module 903, configured to convert the frame data in the tributary unit TU-3 frame format into the frame data in an administrative unit AU-3 frame format.

In the embodiment of the present invention, frame data in a VC4 format is demapped into the frame data in a TU-3 frame format, and the frame data in the TU-3 frame format is converted into the frame data in an AU-3 frame format, thereby recovering the emulated data that is generated by using an method for AU-3 circuit emulation described in the preceding embodiment and meeting the requirement of transparently transmitting AU pointers in the present network, that is, the requirement of emulating and transparently transmitting the content of an entire AU.

Embodiment 10

Figure 14:
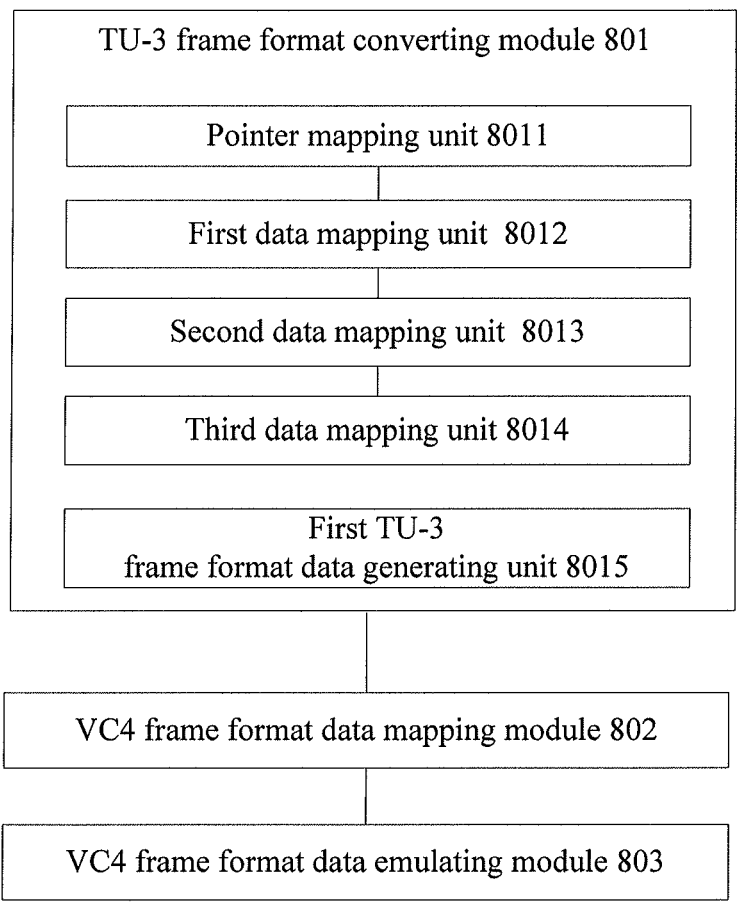
FIG. 14 is a schematic diagram of an apparatus for AU-3 circuit emulation according to Embodiment 10 of the present invention.

FIG. 14 shows an apparatus for AU-3 circuit emulation provided in the present invention. The apparatus is based on the same conception as the method for AU-3 circuit emulation provided in Embodiment 3. On the basis of Embodiment 8, the TU-3 frame format converting module 801 in the apparatus specifically includes:
  a pointer mapping unit 8011, configured to map H1, H2, and H3 bytes in the frame data in an AU-3 frame format to H1, H2, and H3 in column 0 in a TU-3;
  a first data mapping unit 8012, configured to map columns 1 to 29 of a VC3 in the frame data in the AU-3 frame format to columns 1 to 29 of a VC3 in the TU-3;
  a second data mapping unit 8013, configured to map columns 31 to 58 of the VC3 in the frame data in the AU-3 frame format to columns 30 to 57 of the VC3 in the TU-3.
  a third data mapping unit 8014, configured to map columns 60 to 87 of the VC3 in the frame data in the AU-3 frame format to columns 58 to 85 of the VC3 in the TU-3; and
  a first TU-3 frame format data generating unit 8015, configured to generate the frame data in the TU-3 frame format according to H1, H2, and H3 in column 0 in the TU-3, columns 1 to 29 of the VC3 in the TU-3, columns 30 to 57 of the VC3 in the TU-3, and columns 58 to 85 of the VC3 in the TU-3.

In the embodiment of the present invention, frame data is converted from an AU-3 frame format into a TU-3 frame format, the frame data in the TU-3 frame format is mapped into a virtual container VC4 to obtain the frame data in the VC4 frame format, and the frame data in the VC4 frame format is emulated according to an SDH circuit and service emulation technology defined in RFC4842 protocol, thereby meeting a requirement of transparently transmitting AU pointers in the present network, that is, the requirement of emulating and transparently transmitting the content of an entire AU.

Embodiment 11

Figure 15:
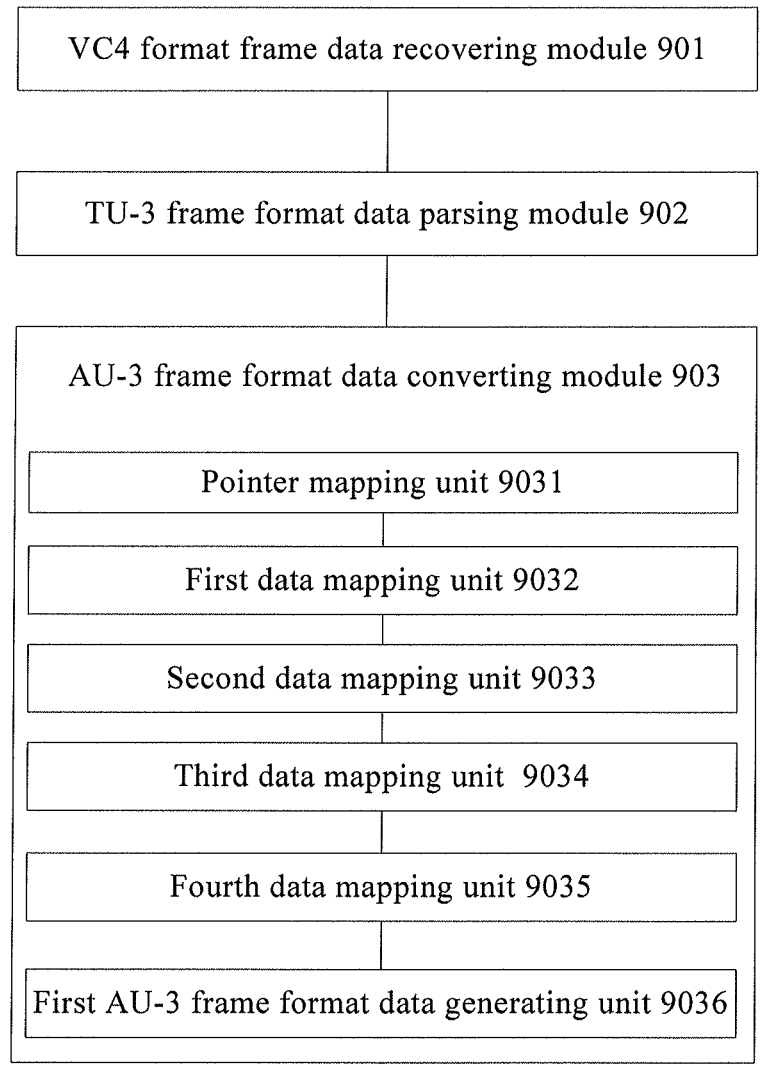
FIG. 15 is a schematic diagram of an apparatus for AU-3 circuit recovery according to Embodiment 11 of the present invention.

FIG. 15 shows an apparatus for AU-3 circuit recovery provided in the present invention. The apparatus is based on the same conception as the method for AU-3 circuit recovery provided in Embodiment 4, and is applicable to recovery of emulated data generated by the apparatus for AU-3 circuit emulation provided in Embodiment 10 of the present invention. On the basis of Embodiment 9, the AU-3 frame format data converting module 903 in the apparatus specifically includes:

a pointer mapping unit 9031, configured to map H1, H2, and H3 bytes in the frame data in the TU-3 frame format to positions H1, H2, and H3 in an AU-3;

a first data mapping unit 9032, configured to map columns 1 to 29 of a VC3 in the frame data in the TU-3 frame format to columns 1 to 29 of a VC3 in the AU-3;

a second data mapping unit 9033, configured to map columns 30 to 57 of the VC3 in the frame data in the TU-3 frame format to columns 31 to 58 of the VC3 in the AU-3.

a third data mapping unit 9034, configured to map columns 58 to 85 of the VC3 in the frame data in the TU-3 frame format to columns 60 to 87 of the VC3 in the AU-3;

a fourth data mapping unit 9035, configured to map preset fixed stuff to columns 30 and 59 of the VC3 in the AU-3; and a first AU-3 frame format data generating unit 9036, configured to generate the frame data in the AU-3 frame format according to H1, H2, and H3 in the AU-3, columns 1 to 29 of the VC3 in the AU-3, columns 30 and 59 of the VC3 in the AU-3, columns 31 to 58 of the VC3 in the AU-3, and columns 60 to 87 of the VC3 in the AU-3.

In the embodiment of the present invention, frame data in a VC4 format is demapped into the frame data in a TU-3 frame format, and the frame data in the TU-3 frame format is converted into the frame data in the AU-3 frame format, thereby recovering the emulated data that is generated by using an method for AU-3 circuit emulation described in the preceding embodiment and meeting the requirement of transparently transmitting AU pointers in the present network, that is, the requirement of emulating and transparently transmitting the content of an entire AU.

Embodiment 12

Figure 16:
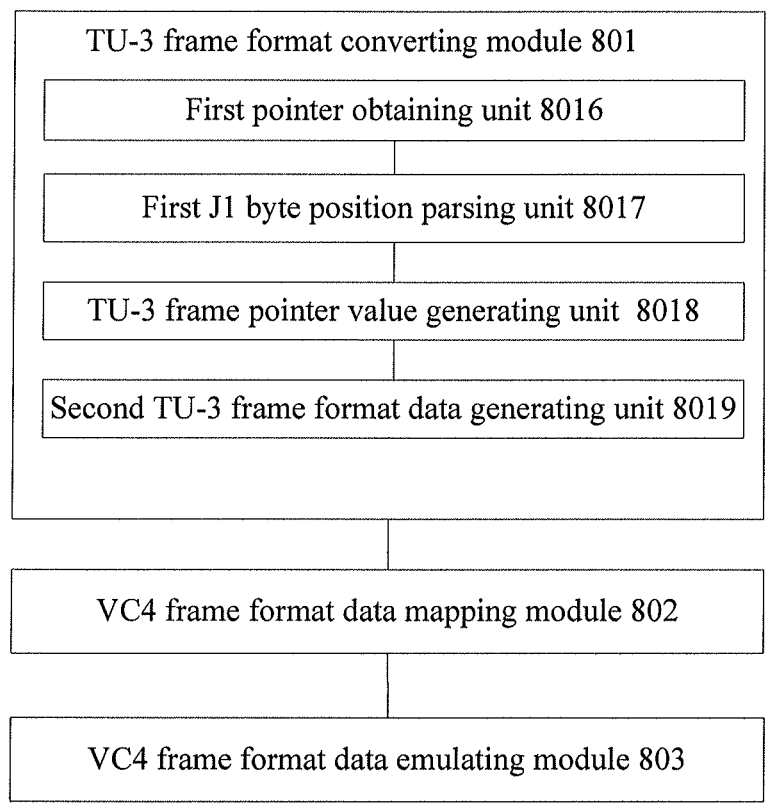
FIG. 16 is a schematic diagram of an apparatus for AU-3 circuit emulation according to Embodiment 12 of the present invention.

FIG. 16 shows an apparatus for AU-3 circuit emulation provided in the present invention. The apparatus is based on the same conception as the method for AU-3 circuit emulation provided in Embodiment 5. On the basis of Embodiment 8, the TU-3 frame format converting module 801 in the apparatus specifically includes:

a first pointer obtaining unit 8016, configured to obtain a pointer value of the frame data in the AU-3 frame format;

a first J1 byte position parsing unit 8017, configured to deduce the position of a J1 byte in the frame data in the AU-3 frame format according to the pointer value;

a TU-3 frame pointer value generating unit 8018, configured to map VC3 data in the frame data in the AU-3 frame format into a VC3 of a TU-3 frame, and re-generate a pointer value of the TU-3 frame according to the position of the J1 byte; and a second TU-3 frame format data generating unit 8019, configured to generate the frame data in the TU-3 frame format according to the pointer value of the TU-3 frame and the VC3 of the TU-3 frame.

In the embodiment of the present invention, frame data is converted from an AU-3 frame format into a TU-3 frame format, the frame data in the TU-3 frame format is mapped into a virtual container VC4 to obtain the frame data in the VC4 frame format, and the frame data in the VC4 frame format is emulated according to an SDH circuit and service emulation technology defined in RFC4842 protocol, thereby meeting a requirement of transparently transmitting AU pointers in the present network, that is, the requirement of emulating and transparently transmitting the content of an entire AU.

Embodiment 13

Figure 17:
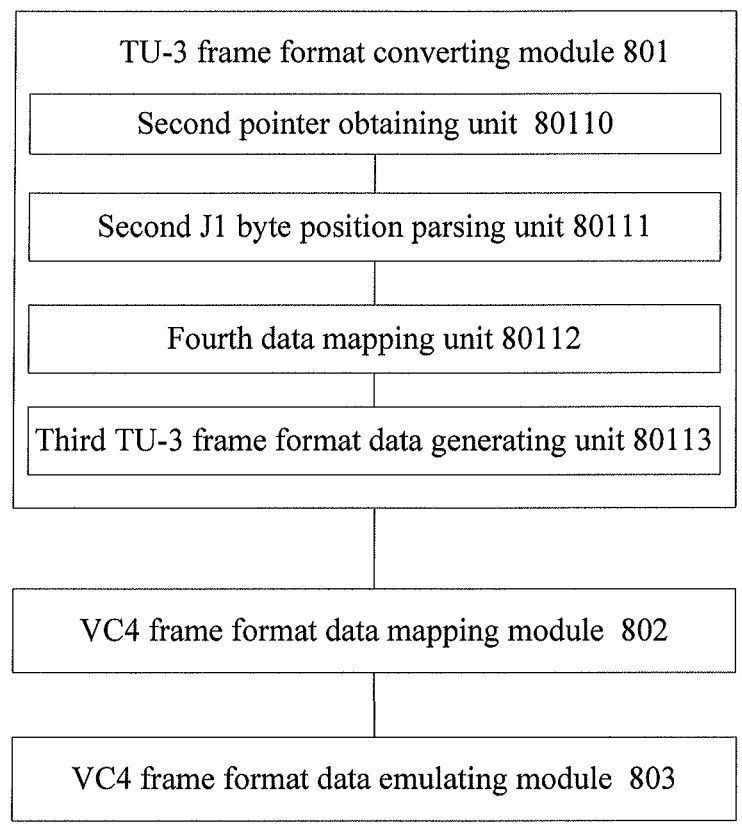
FIG. 17 is a schematic diagram of an apparatus for AU-3 circuit emulation according to Embodiment 13 of the present invention.

FIG. 17 is a schematic diagram of an apparatus for AU-3 circuit emulation provided in the present invention. The apparatus is based on the same conception as the method for AU-3 circuit emulation. On the basis of Embodiment 8, the TU-3 frame format converting module 801 in the apparatus specifically includes:

a second pointer obtaining unit 80110, configured to obtain a pointer value of the frame data in the AU-3 frame format;

a second J1 byte position parsing unit 80111, configured to deduce a position of a J1 byte in the frame data in the AU-3 frame format according to the pointer value;

a fourth data mapping unit 80112, configured to map VC3 data in the frame data in the AU-3 frame format into a VC3 of a TU-3 frame; and a third TU-3 frame format data generating unit 80113, configured to generate the frame data in the TU-3 frame format according to the position of the J1 byte, a preset TU-3 pointer value, and the VC3 of the TU-3 frame.

In the embodiment of the present invention, frame data is converted from an AU-3 frame format into a TU-3 frame format, the frame data in the TU-3 frame format is mapped into a virtual container VC4 to obtain the frame data in the VC4 frame format, and the frame data in the VC4 frame format is emulated according to an SDH circuit and service emulation technology defined in RFC4842 protocol, thereby meeting a requirement of transparently transmitting AU pointers in the present network, that is, the requirement of emulating and transparently transmitting the content of an entire AU.

Embodiment 14

Figure 18:
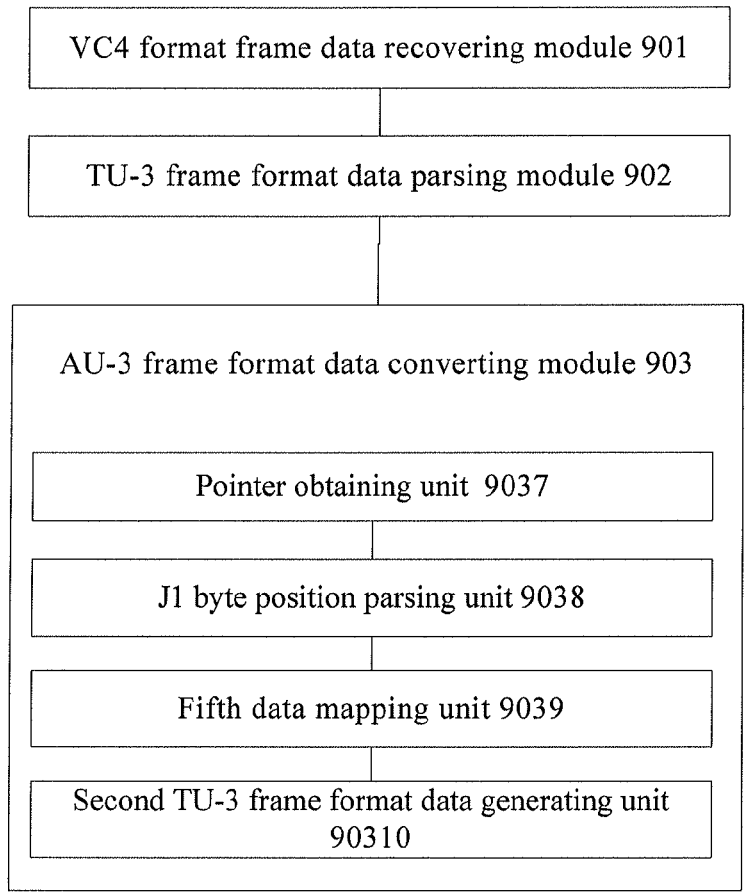
FIG. 18 is a schematic diagram of an apparatus for AU-3 circuit recovery according to Embodiment 14 of the present invention.

FIG. 18 shows an apparatus for AU-3 circuit recovery provided in the present invention. The apparatus is based on the same conception as the method for AU-3 circuit recovery provided in Embodiment 7, and is applicable to recovery of emulated data generated by the apparatus for AU-3 circuit emulation provided in Embodiment 12 or 13 of the present invention. On the basis of Embodiment 9, the AU-3 frame format data converting module 903 in the apparatus specifically includes:

a pointer obtaining unit 9037, configured to obtain a pointer value of the frame data in the TU-3 frame format;

a J1 byte position parsing unit 9038, configured to deduce a position of a J1 byte in the frame data in the TU-3 frame format according to the pointer value;

a fifth data mapping unit 9039, configured to map a VC3 in the frame data in the TU-3 frame format into a VC3 of an AU-3, and re-generate a pointer value of the AU-3 according to the position of the J1 byte; and a second AU-3 frame format data generating unit 90310, configured to generate the frame data in the AU-3 frame format according to the pointer value of the AU-3 and the VC3 of the AU-3.

In the embodiment of the present invention, frame data in a VC4 format is demapped into the frame data in a TU-3 frame format, and the frame data in the TU-3 frame format is converted into the frame data in the AU-3 frame format, thereby recovering the emulated data that is generated by using an method for AU-3 circuit emulation described in the preceding embodiment and meeting the requirement of transparently transmitting AU pointers in the present network, that is, the requirement of emulating and transparently transmitting the content of an entire AU.

Figure 19:
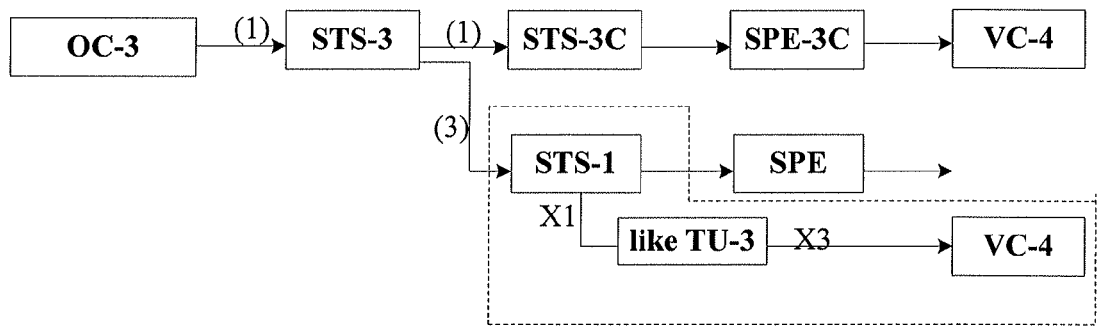
FIG. 19 is a schematic diagram of a SONET emulation mapping path according to an embodiment of the present invention.

It should be noted that the application scope of the embodiment of the present invention may be extended to a SONET emulation scenario. As shown in FIG. 19, an STS-1 (Synchronous Transport Signal-1, synchronous transport signal_1) is encapsulated into a frame format similar to a TU-3, and encapsulated into a VC4, and the STS-1 is emulated by emulating the VC4, where the service mapping path of conversion from an STS-1 to a TU-3 is shown by the dashed box in FIG. 19.

Persons of ordinary skill in the art should understand that all or part of the steps of the methods in the embodiments may be implemented by a program instructing relevant hardware. The program may be stored in a computer readable storage medium. When the program runs, the above steps of the methods in the embodiments are performed. The storage medium may be any medium capable of storing program codes, such as ROM, RAM, magnetic disk, or optical disk, and the like.

Finally, it should be noted that the embodiments of the present invention are intended for describing the technical solution of the present invention other than limiting the present invention. Although the present invention is described in detail with reference to the foregoing embodiments, persons of ordinary skill in the art should understand that they can still make modifications to the technical solution described in the foregoing embodiments or make substitutions to some technical features thereof, without departing from the spirit and scope of the technical solution of the embodiments of the present invention.

What is claimed is:

1. A method for Administrative Unit-3 (AU-3) circuit emulation, comprising:
converting frame data from an AU-3 frame format into a tributary unit-3 (TU-3) frame format;
mapping the frame data in the TU-3 frame format into a virtual container-4 (VC4) to obtain the frame data in a VC4 frame format; and
emulating the frame data in the VC4 frame format;
wherein the converting frame data from an AU-3 frame format into a TU-3 frame format comprises:
mapping H1, H2, and H3 bytes pointing to a virtual container-3 (VC3) in the frame data in the AU-3 frame format to H1, H2, and H3 bytes pointing to a VC3 in column 0 in a TU-3;
mapping columns 1 to 29 of the VC3 in the frame data in the AU-3 frame format to columns 1 to 29 of the VC3 in the TU-3;
mapping columns 31 to 58 of the VC3 in the frame data in the AU-3 frame format to columns 30 to 57 of the VC3 in the TU-3;
mapping columns 60 to 87 of the VC3 in the frame data in the AU-3 frame format to columns 58 to 85 of the VC3 in the TU-3; and
generating the frame data in the TU-3 frame format according to H1, H2, and H3 bytes in column 0 in the TU-3, columns 1 to 29 of the VC3 in the TU-3, columns 30 to 57 of the VC3 in the TU-3, and columns 58 to 85 of the VC3 in the TU-3;
or,
wherein the converting frame data from an AU-3 frame format into a TU-3 frame format comprises:
obtaining a pointer value of the frame data in the AU-3 frame format;
deducing a position of a J1 byte in the frame data in the AU-3 frame format according to the pointer value, wherein the J1 byte is the first byte in a virtual container-3 (VC3);
mapping the VC3 in the frame data in the AU-3 frame format into the VC3 of a TU-3 frame, and re-generating a pointer value of the TU-3 frame according to the position of the J1 byte; and
generating the frame data in the TU-3 frame format according to the pointer value of the TU-3 frame and the VC3 of the TU-3 frame.

2. A method for Administrative Unit-3 (AU-3) circuit recovery, comprising:
recovering frame data in a virtual container-4 (VC4) format from a received packet;
demapping the frame data in the VC4 format into the frame data in a tributary unit-3 (TU-3) frame format; and
converting the frame data in the TU-3 frame format into the frame data in an administrative unit AU-3 frame format;
wherein the converting the frame data in the TU-3 frame format into the frame data in an AU-3 frame format comprises:
mapping H1, H2, and H3 bytes pointing to a virtual container-3 (VC3) in the frame data in the TU-3 frame format to H1, H2, and H3 pointing to a VC3 in an AU-3;
mapping columns 1 to 29 of the VC3 in the frame data in the TU-3 frame format to columns 1 to 29 of the VC3 in the AU-3;
mapping columns 30 to 57 of the VC3 in the frame data in the TU-3 frame format to columns 31 to 58 of the VC3 in the AU-3;
mapping columns 58 to 85 of the VC3 in the frame data in the TU-3 frame format to columns 60 to 87 of the VC3 in the AU-3;
mapping preset fixed stuff to columns 30 and 59 of the VC3 in the AU-3; and
generating the frame data in the AU-3 frame format according to the H1, H2, and H3 bytes in the AU-3, columns 1 to 29 of the VC3 in the AU-3, columns 30 and 59 of the VC3 in the AU-3, columns 31 to 58 of the VC3 in the AU-3, and columns 60 to 87 of the VC3 in the AU-3;
or,
wherein the converting the frame data in the TU-3 frame format into the frame data in an AU-3 frame format comprises:
obtaining a pointer value of the frame data in the TU-3 frame format;
deducing a position of a J1 byte in the frame data in the TU-3 frame format according to the pointer value, wherein the J1 byte is the first byte in a virtual container-3 (VC3);

mapping the VC3 in the frame data in the TU-3 frame format into the VC3 of an AU-3, and re-generating a pointer value of the AU-3 according to the position of the J1 byte; and generating the frame data in the AU-3 frame format according to the pointer value of the AU-3 and the VC3 of the AU-3.

3. An apparatus for Administrative Unit-3 (AU-3) circuit emulation, comprising a processor and a non-transitory computer readable storage medium including executable instructions that, when executed by the processor perform a method comprising:

converting frame data from an administrative unit AU-3 frame format into a tributary unit TU-3 frame format;

mapping the frame data in the TU-3 frame format into a VC4 to obtain the frame data in a VC4 frame format; and emulating the frame data in the VC4 frame format;

wherein the converting frame data from an administrative unit AU-3 frame format into a tributary unit TU-3 frame format comprises:

mapping H1, H2, and H3 bytes pointing to a virtual container-3 (VC3) in the frame data in the AU-3 frame format to H1, H2, and H3 bytes pointing to a VC3 in column 0 in a TU-3;

mapping columns 1 to 29 of the VC3 in the frame data in the AU-3 frame format to columns 1 to 29 of the VC3 in the TU-3;

mapping columns 31 to 58 of the VC3 in the frame data in the AU-3 frame format to columns 30 to 57 of the VC3 in the TU-3;

mapping columns 60 to 87 of the VC3 in the frame data in the AU-3 frame format to columns 58 to 85 of the VC3 in the TU-3; and generating the frame data in the TU-3 frame format according to the H1, H2, and H3 bytes in column 0 in the TU-3, columns 1 to 29 of the VC3 in the TU-3, columns 30 to 57 of the VC3 in the TU-3, and columns 58 to 85 of the VC3 in the TU-3;

or, wherein the converting frame data from an administrative unit AU-3 frame format into a tributary unit TU-3 frame format comprises:

obtaining a pointer value of the frame data in the AU-3 frame format;

deducing a position of a J1 byte in the frame data in the AU-3 frame format according to the pointer value, wherein the J1 byte is the first byte in a virtual container-3 (VC3);

mapping the VC3 in the frame data in the AU-3 frame format into the VC3 of a TU-3 frame, and re-generating a pointer value of the TU-3 frame according to the position of the J1 byte; and generating the frame data in the TU-3 frame format according to the pointer value of the TU-3 frame and the VC3 of the TU-3 frame.

4. An apparatus for Administrative Unit-3 (AU-3) circuit recovery, comprising a processor and a non-transitory computer readable storage medium including executable instructions that, when executed by the processor perform a method comprising:

recovering frame data in a virtual container-4 (VC4) format from a received packet;

demapping the frame data in the VC4 format into the frame data in a tributary unit-3 (TU-3) frame format; and converting frame data in the tributary unit TU-3 frame format into the frame data in an administrative unit AU-3 frame format;

wherein the converting frame data in the tributary unit TU-3 frame format into the frame data in an administrative unit AU-3 frame format comprises:

mapping H1, H2, and H3 bytes pointing to a virtual container-3 (VC3) in the frame data in the TU-3 frame format to H1, H2, and H3 bytes pointing to a VC3 in an AU-3;

mapping columns 1 to 29 of the VC3 in the frame data in the TU-3 frame format to columns 1 to 29 of the VC3 in the AU-3;

mapping columns 30 to 57 of the VC3 in the frame data in the TU-3 frame format to columns 31 to 58 of the VC3 in the AU-3;

mapping columns 58 to 85 of the VC3 in the frame data in the TU-3 frame format to columns 60 to 87 of the VC3 in the AU-3;

mapping preset fixed stuff to columns 30 and 59 of the VC3 in the AU-3; and generating the frame data in the AU-3 frame format according to the H1, H2, and H3 bytes in the AU-3, columns 1 to 29 of the VC3 in the AU-3, columns 30 and 59 of the VC3 in the AU-3, columns 31 to 58 of the VC3 in the AU-3, and columns 60 to 87 of the VC3 in the AU-3;

or, wherein the converting frame data in the tributary unit TU-3 frame format into the frame data in an administrative unit AU-3 frame format comprises:

obtaining a pointer value of the frame data in the TU-3 frame format;

deducing a position of a J1 byte in the frame data in the TU-3 frame format according to the pointer value, wherein the J1 byte is the first byte in a virtual container-3 (VC3);

mapping the VC3 in the frame data in the TU-3 frame format into the VC3 of an AU-3, and re-generating a pointer value of the AU-3 according to the position of the J1 byte; and generating the frame data in the AU-3 frame format according to the pointer value of the AU-3 and the VC3 of the AU-3.

* * * * *